Figure 1:
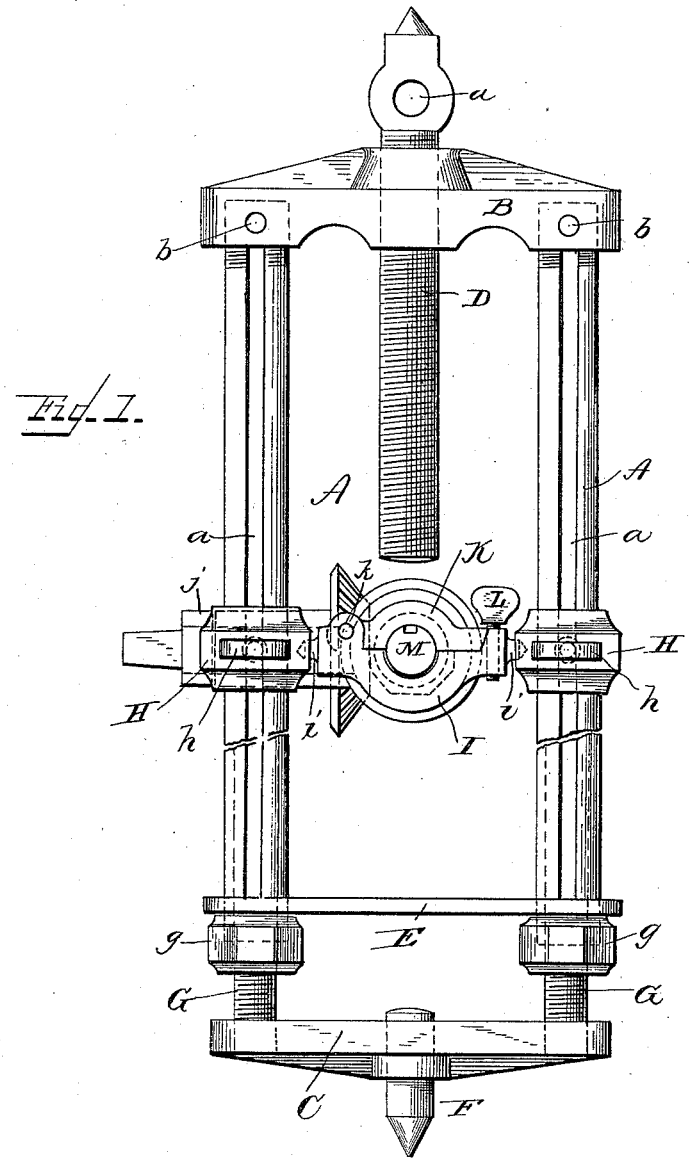

(No Model.)

2 Sheets—Sheet 1.

E. WALL.
COAL BORING MACHINE.

No. 301,188. Patented July 1, 1884.

WITNESSES
F. L. Ourand
C. L. Miller

INVENTOR
Edwin Wall,
per Chas. H. Fowler
Attorney

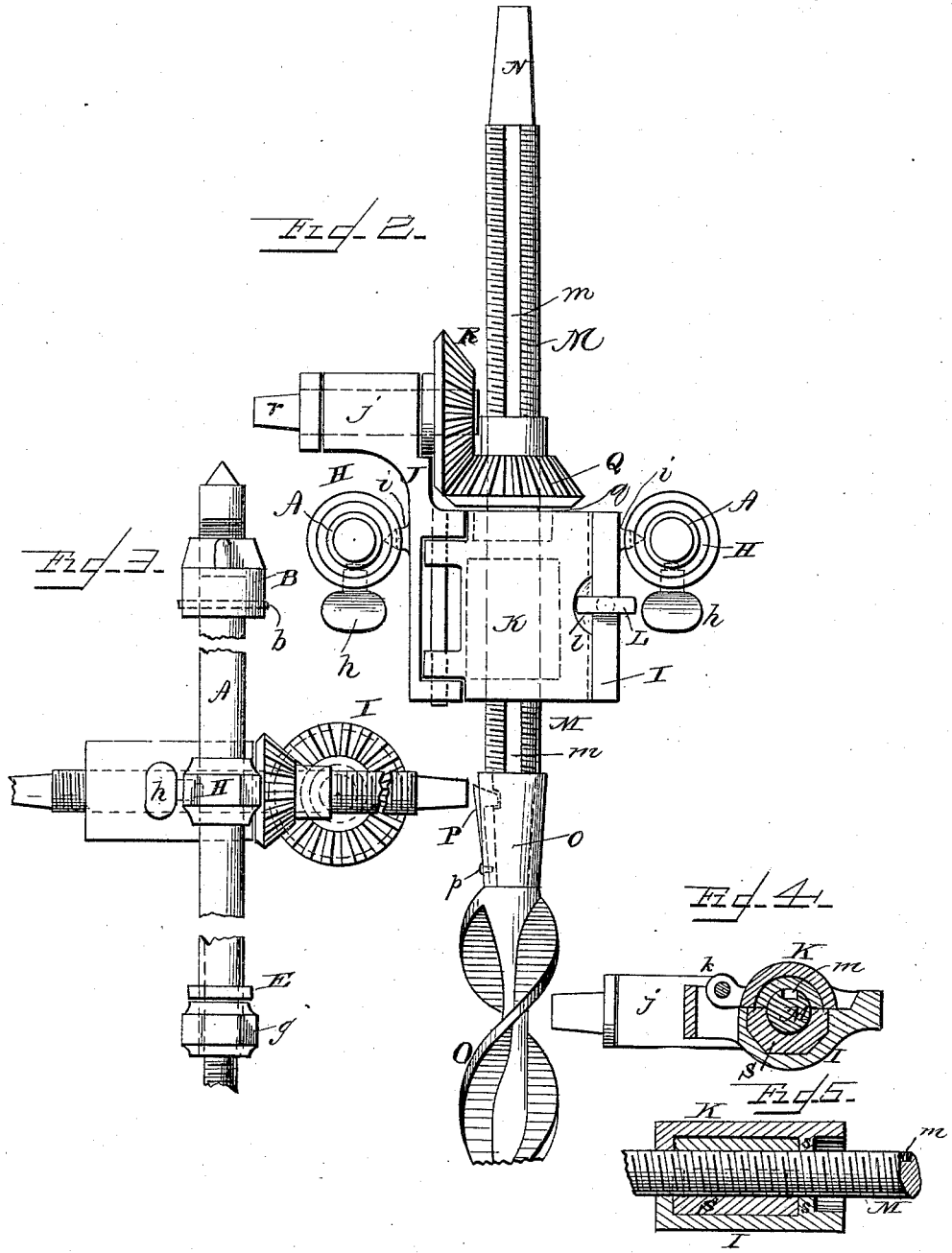

United States Patent Office.

EDWIN WALL, OF HARMONY, INDIANA.

COAL-BORING MACHINE.

SPECIFICATION forming part of Letters Patent No. 301,188, dated July 1, 1884.

Application filed April 30, 1884. (No model.)

*To all whom it may concern:*

Be it known that I, EDWIN WALL, a citizen of the United States, residing at Harmony, in the county of Clay and State of Indiana, have invented certain new and useful Improvements in Coal-Boring Machines; and I do hereby declare that the following is a full, clear, and exact description of the same, reference being had to the annexed drawings, making a part of this specification, and to the letters and figures of reference marked thereon.

My invention relates to mining-machines, and has for its object to so construct the main or supporting frame that the same may be adjusted in length in order to clamp it in position.

It has for a further object to provide adjustable bearings for the threaded feed boxing or barrel and a novel and economical construction of the said boxing.

The invention consists in the novel mechanism whereby I attain the objects above enumerated, and in other improvements, as will be hereinafter described and specified.

In the accompanying drawings, Figure 1 is an elevation of my machine. Fig. 2 is a transverse section of same, the drill-shaft, boxing, &c., being shown in plan; and Fig. 3 is an edge view of the machine on a reduced scale, and Figs. 4 and 5 are respectively transverse and longitudinal sections of the threaded barrel.

The main or supporting frame is composed of the standards A, the head-bar B, and the base-bar C. The standards A are provided with longitudinal grooves $a$, and their upper ends are threaded and turned into threaded sockets in the head-bar, in order to connect said parts. This connection may be made secure by rivets or bolts $b$, driven transversely through the head-bar and the standards, as shown in Fig. 1. A clamping-screw, D, is turned through a threaded opening formed through the head-bar, and has its outer end pointed or otherwise suitably formed to bind against the walls of a mining-chamber. This screw may be provided with an opening, $d$, to receive a lever-bar, or otherwise suitably formed so it may be revolved. The standards, it will be understood, are made tubular—that is, at least for a sufficient distance from their lower ends—to receive the arms of the base-piece C. I connect and brace the lower ends of the standards by a bar, E, so that said ends will be firmly connected, and not depend wholly for bracing on the base-piece. This base-piece C is provided with an outwardly-projected binding-point, F, and has threaded arms G extended upward from its opposite ends and into the lower ends of the hollow standards. Nuts $g$ turn on these threaded arms and bear against the ends of the standards. I preferably form the upper face of the nuts $g$ with mortises suitable to receive the ends of the standards, as indicated in dotted lines, Fig. 1.

It will be seen that by means of the base-bar and threaded arms of same, together with the nuts $g$, I am able to adjust my frame to fit snugly within any ordinary mining passage, when by turning the clamping-screw D it may be clamped firmly in desired position. The bearing-rings H are placed and movable on the standards A. Set-screws $h$ are turned through these rings and bear against the standards, so that the rings may be clamped at any point along the standards. The points of these screws $h$ bear in the groove $a$, so that the said rings cannot turn on the standards when under strain of the operation. It is manifest that instead of the groove $a$ the rings could be keyed on the standards in various ways—for instance, by making the standards angular in cross-section and the rings fitted thereto—but I prefer the construction shown and before described, because of its simplicity and efficiency. These rings are provided with sockets or bearings for the trunnions of the boxing, which sockets are preferably tapered, as indicated, for the purposes presently described. The boxing I is provided on opposite sides with trunnions $i$, fitted to the bearings in the rings H. These trunnions are preferably tapered, as are the bearings, so that by moving one of the rings along its standard the trunnion will slip out of its bearing-socket, so that the drilling parts may be reversed or turned, as will be presently described. By these trunnions the boxing may be turned so as to drill at any suitable angle to the horizontal. A bracket, J, is extended from the boxing, and is provided with a bearing, $j$, for the drive-shaft. I cast the boxing with a recess on its inner face, into which is fitted a plate, S, having a half-round threaded mortise formed on its face. The side of this plate which fits in the recess of the boxing is made angular, as shown in Fig. 4, so as to prevent the plate from turning in the boxing, and it is held from longitudinal movement out of the boxing by the end flanges, s, thereof, as will be understood from Fig. 5. This plate forms one-half the threaded bearing for the drill-shaft, and when worn or otherwise defective may be replaced at slight cost. I thus dispense with the threads in the face of the boxing, to renew which when worn would be expensive and inconvenient; also, by means of the threaded plate and the cover, presently described, I am able by providing several of said parts having different threads to have different speeds for different lines of work. The cover K is hinged at one side, k, to the boxing, and is provided at its opposite side, which fits snugly down against the boxing, with a lip, l, beveled or inclined upward with reference to the motion of screw L, having a thumb-ring which binds on said lip, l, and binds the cover to the boxing. By means of the beveled lip it will be understood the tighter the screw is turned the more firmly the cover is clamped to the boxing. The inner side of the cover is threaded correspondingly to the threaded plate before described, and together therewith forms the bearing for the drill-shaft M, which is threaded and provided with a longitudinal groove, m. The opposite ends of this shaft are made with angular stems N, fitted to receive the socket o of the drill O. A spring-catch, P, is secured to the socket o by an adjusting-screw, p, and has its point operating through an opening through the socket and into a recess or notch in the stem N, as clearly indicated in Fig. 2. A bevel-gear, Q, is placed on the drill-shaft, and has a stem or shank, q, which fits into a suitable recess in the threaded barrel, as indicated in Fig. 2, and serves to steady and brace the wheel during its operation. A feather or rib on the inner bore of this wheel operates in the groove m of the drill-shaft, and serves to rotate the said shaft when the wheel Q is revolved. A bevel-gear, R, is meshed with wheel Q, and has its shaft r journaled in bearing j, and adapted to be driven by hand or any suitable power.

In operation, by removing the threaded barrel, composed of the boxing-cover and threaded plate, from its bearing in rings H the said barrel may be turned from the position shown in Fig. 2, so as to bring its bearing j and drive-shaft over to the right side; or the barrel, drill-shaft, &c., may be inserted through between the standards, so that bearing j will be on the lower side of the standards, and on either the right or left. The terms "right" and "left" and "rear" side above used, are for convenience of reference, and relate to Fig. 2. By the changeability of the barrel's position I am able to so arrange the drive-shaft and its bearings j, when in close quarters, as to avoid obstructions. It should be understood that the threaded barrel is removed by moving one of the rings H along the standard A, which will cause the trunnions on the barrel to be disengaged with its bearings.

Having thus described my invention, what I claim, and desire to secure by Letters Patent, is—

1. The combination, with the standard provided with sliding rings having conical or tapering sockets, of a threaded barrel to which the drill-shaft is connected, said barrel having trunnions in form to correspond to the conical or tapering bearing-sockets in the rings, whereby the movement of the rings along the standards will enable the removal of the barrel from the frame, substantially as and for the purpose set forth.

2. In a coal-boring machine, a suitable frame adapted to be extended lengthwise, and having mounted on its standards sliding rings formed with conical or tapering bearing-sockets, in combination with a threaded barrel consisting of a semicircular boxing provided with a hinged cover and a semicircular screw-threaded plate having angular sides, which fit in a correspondingly-formed recess in the boxing, end flanges formed on the interior of the cover and boxing to hold the plate from longitudinal movement, said boxing having tapering or conical trunnions to fit in the sockets of the sliding rings, substantially as and for the purpose set forth.

3. A coal-boring machine consisting of a frame composed of two grooved standards connected at one end by a head-bar, and at their opposite ends formed with a hollow screw-threaded socket, and threaded arms entering said sockets and connected together by a base-piece, suitable nuts for holding the arms extended, sliding rings mounted upon the standards and having conical bearing-sockets, and a threaded barrel for the drill-shaft provided with conical trunnions, substantially as and for the purpose specified.

In testimony that I claim the above I have hereunto subscribed my name in the presence of two witnesses.

EDWIN WALL.

Witnesses:
F. H. EATON,
GEORGE H. WHITE.